Figure 4:
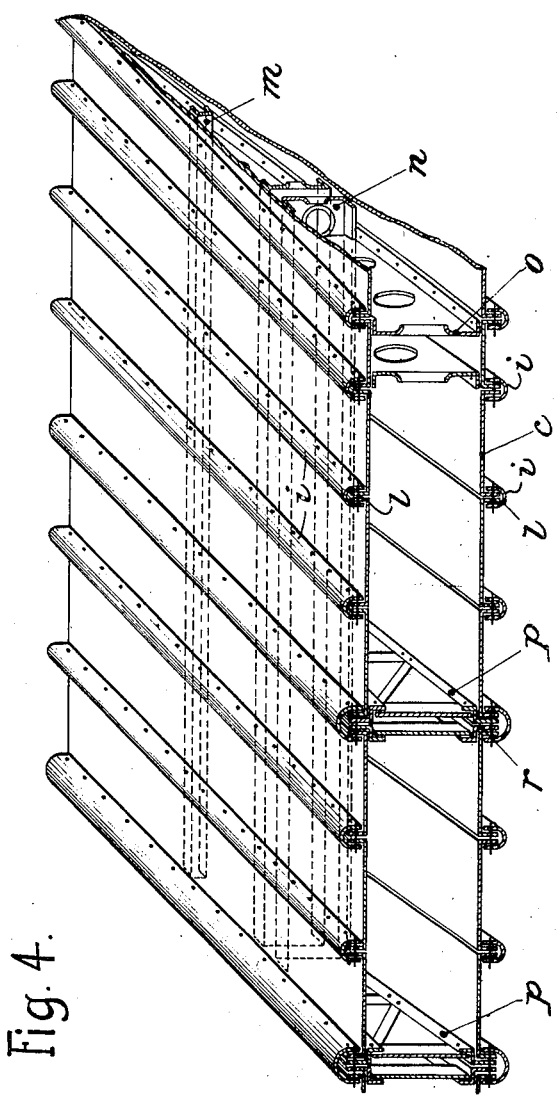

June 12, 1923.　　　　　　　　　　　　　　　1,458,645
C. DORNIER
METALLIC STRUCTURE FOR AIRCRAFT
Filed March 31, 1921　　　2 Sheets-Sheet 1
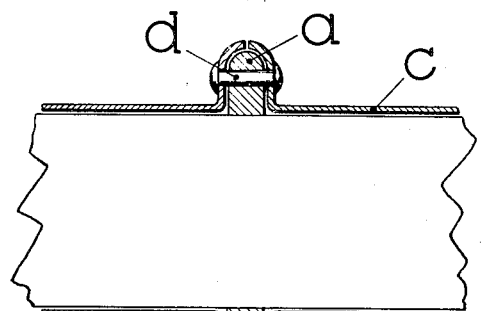
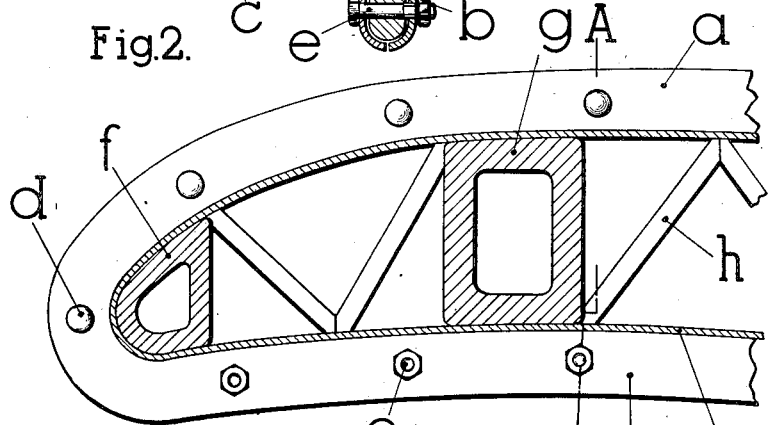
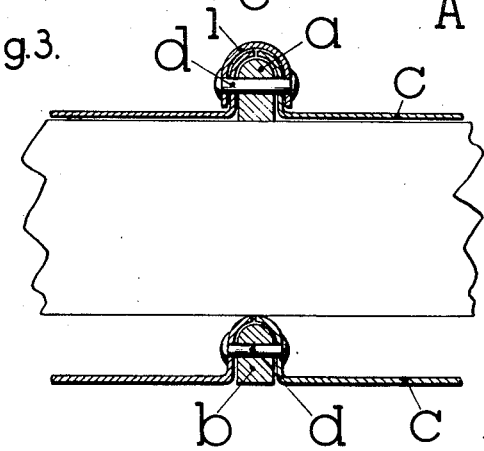
INVENTOR:

Patented June 12, 1923.

1,458,645

UNITED STATES PATENT OFFICE.

CLAUDIUS DORNIER, OF FRIEDRICHSHAFEN, GERMANY, ASSIGNOR TO ZEPPELIN-WERKE LINDAU, GESELLSCHAFT MIT BESCHRANKTER HAFTUNG, OF LINDAU-REUTIN, GERMANY, A GERMAN CORPORATION.

METALLIC STRUCTURE FOR AIRCRAFT.

Application filed March 31, 1921. Serial No. 457,543.

*To all whom it may concern:*

Be it known that I, CLAUDIUS DORNIER, a citizen of the German Empire, residing at Friedrichshafen, Germany, have invented certain new and useful Improvements in Metallic Structures for Aircraft (for which I have filed applications in Germany Febr. 3, 1920, and Apr. 19, 1920), of which the following is a specification.

My invention relates to a metal lining specially suitable for the supporting planes of flying machines. The suitable covering of the supporting planes, hulls, cars, etc. of aircraft by means of sheet metal, in particular when employing thin sheet metal plates, offers considerable difficulties. For if flat thin plates of sheet metal be fixed by rivets, they are stretched by the riveting process, so that they will obtain a bulging, unsightly appearance. Besides, bulgings once formed cannot be again removed. What is more, repairs are almost entirely impossible. Besides, in order to be able to at all secure the fastening of the skin, say, for example, of the wings, holes must be provided therein.

The foregoing defects are remedied in accordance with my invention by the sheet metal lining being composed of single strips of sheet metal disposed intermediate the ribs, so that the outer skin will come to be set back relatively to the ribs, by which means the possibility is afforded of giving to the ribs a greater height, while at the same time only slightly increasing the air resistance, and therewith making the ribs and the longitudinal girders substantially lighter in weight. However, it is not absolutely necessary to set back the outer skin relatively to the ribs or booms on the upper and lower side of the wing, i. e. on the entire outer skin; in other words, only a portion of the outer skin need be carried out in the manner aforesaid.

A further improvement both as regards design and construction is achieved, in accordance with an additional feature of my invention, by specially shaped plates being fitted across the ribs and the sheet metal lining joined at these points. By these means any deformation of the thin sheet metal covering will be lessened or even entirely obviated. Besides, such specially shaped plates will constitute an extremely desirable reinforcement of the flanges of the ribs. Moreover, by these means the number of rivets, bolts and the like required for the fastening of the outer skin may be considerably lessened in accordance with the rigidity pertaining to the specially shaped plates, so that the entire method of construction will be simplified.

However, instead of providing special flanges for the ribs, the sheet metal strips may also, subject to my invention, be bent over at their side edges and be combined by substantially U-shaped plates fixed on from without to constitute a uniform covering, the stiffening means for which might be formed, on the one hand, by the rib-shaped, bent over edges of the sheet metal plates, and on the other hand, by profile irons arranged on the back and disposed transversely to the direction of flight. The sheet metal plate thus constructed, may, for its part, be fixed to a rigid sub-structure, preferably with the omission of internal stiffening means. These said profile irons may, if thought expedient, be fixed to the inside of the sheet metal covering, and extend either only across a single sheet metal strip or a plurality thereof, or even, say, for example, the entire wing.

The individual strips may be of any desired width whatsoever. They may run from narrow bands right up to sheet metal plates of the usual commercial width. For practical purposes it may be found expedient to make use of average width of plate which will still afford the possibility of employing plates of comparatively slight thickness, in which case the lateral joints will come to be created in such numbers that the sheet metal covering will in and for itself become comparatively stiff, so that the transverse girders may be spaced at a considerably greater distance apart than in the case of the constructions hitherto customary. It will, moreover, be found expedient when carrying out work on the single sheet metal plates to pay due consideration to the spacing of the transverse girders, though this is not absolutely necessary. For the strong girders belonging to the stiff inside wing structure, such, for example, as the longitudinal girders, or individually arranged transverse girders serving to take up special loads, a very favourable method of combination with the sheet metal covering may be secured by this latter being in places adapted to serve as the upper or lower flange for the girders arranged in pairs and constructed to form, say, simple, narrow frame work members, so that each pair of girders will always come to be united or combined into a substantially closed box-shaped girder. At the same time, a very simple method of fastening the transverse girders will be secured by the transverse girders, shaped to constitute in the customary manner, narrow frame work girders, being so constructed that they can be inserted with the outer edge of their upper and lower flanges, respectively, into the joints intermediate two sheet metal plates.

In this connection the individual girders may be preferably given a T- or U-shaped form, being inserted with their vertical web into the wings in such wise that their shanks may be riveted to the sheet metal covering.

In the drawings affixed to this specification and forming part thereof, several modifications of aeroplane wing structures embodying my invention are illustrated by way of example. In the drawings—

Fig. 1 is a section through a supporting plane on line A—A in Fig. 2 taken at right angles to the direction of flight, Fig. 2 is a corresponding longitudinal section, Fig. 3 is a section similar to that shown in Fig. 1, disclosing portion of the wing with the outer skin partly set back, and Fig. 4 is a cross section of a perspectively drawn supporting plane, having no special rib members.

Referring to the drawings, the upper flanges of the ribs are denoted by $a$ and the lower by $b$. The outer skin $c$, which consists of thin sheet metal, is composed of single plates $c$ of sheet metal jointed at the upper edge of the upper flanges $a$ or the lower edge of the lower flanges $b$. The connection between the outer skin $c$ and the upper flanges $a$ of the ribs is effected by means of rivets $d$, whereas in the case of the lower flanges $b$ the connection is established by bolts $e$.

Fig. 2 discloses the improved wing construction. At the point of the wing there is arranged a front girder $f$, whereas the main forces are taken up by a girder $g$. The upper and lower flanges of the rib are connected by a frame work member $h$. The outer skin is set back relatively to the flanges of the ribs both at the upper and the underside of the wing.

In contradistinction to this form of construction, in the modification shown in Fig. 3, the outer skin $c$ is only set back relatively to the upper flanges $a$ on the upper side of the wing, whereas on the under side, the lower flanges $b$ of the ribs lie flush with the outer skin $c$. On the upper side of the wing there are fitted across the flanges, or across the sheet metal plates covering them, specially shaped plates $i$, by which, on the one hand, the flanges are reinforced, while on the other hand, the method of construction is greatly facilitated.

In the modification disclosed in Fig. 4, the covering consists of a series of single strips $c$, which are bent down at their side edges $l$ and jointed by means of a U-shaped strip $i$ by the aid of rivets or bolts.

For the purpose of reinforcing the cover, use is made of a channel-shaped member $m$ fixed to the interior of the upper side of the wing. In addition there are provided a longitudinal girder $n$ as also a transverse girder $o$, both box-shaped in form. The transverse girder which, in accordance with my invention, consists of two substantially U-shaped irons, is riveted at its shanks to the upper or lower sheet metal plate, respectively. Standard transverse girders $p$ of customary shape are fitted always intermediate two sheet metal plates and this by special doubly bent angle irons $r$ being fixed to the upper and lower flanges, respectively, which for their part are riveted together with the side edges of the sheet metal strips $c$ and the specially shaped plates $i$.

The invention is intended primarily for use in connection with the wings of flying machines; however, it will be found when applied to hulls, boats and the like, to similarly involve manifest advantages.

I claim:—

1. In a flying machine supporting surface in combination, a plurality of longitudinal ribs and sheet metal strips extending in parallel with and between said ribs near the upper and lower edges, respectively, thereof, but so as to be set back relatively to said ribs.

2. In a flying machine supporting surface in combination, a plurality of longitudinal ribs, sheet metal strips extending in parallel with and between said ribs near the upper and lower edges, respectively, thereof, so as to close up the interstices between said ribs and sheet metal covers extending along and covering the joints between said strips.

3. In a flying machine supporting surface in combination, a plurality of longitudinal ribs, sheet metal strips extending in parallel with and between said ribs near the upper and lower edges, respectively, thereof, so as to close up the interstices between and to be set back relatively to said ribs and sheet metal covers extending along and covering said ribs and the edges of said strips contacting therewith.

4. In a flying machine supporting surface in combination, a plurality of longitudinal ribs, sheet metal strips extending in parallel with and between said ribs near the upper and lower edges, respectively, thereof, adjoining portions of said strips being bent off at right angles and means for connecting said portions and said ribs, respectively.

5. In a flying machine supporting surface in combination, a plurality of longitudinal ribs, transverse beams crossing said ribs, sheet metal strips extending in parallel with and between said ribs near the upper and lower edges, respectively, thereof, adjoining portions of said strips being bent off at right angles and means for connecting said portions and said ribs, respectively.

6. In a flying machine supporting surface in combination, a plurality of longitudinal ribs formed after the manner of frame work girders, sheet metal strips extending in parallel with and between said ribs near the upper and lower flanges of said ribs, adjoining portions of said strips being bent off at right angles, the flanges of said ribs extending into the interstices between the said strips and means for connecting said flanges and said bent-off portions.

7. In a flying machine supporting surface in combination, a plurality of longitudinal ribs formed after the manner of frame work girders, sheet metal strips extending in parallel with and between said ribs near the upper and lower flanges of said ribs, adjoining portions of said strips being bent off at right angles, the flanges of said ribs extending into the interstices between the said strips and sheet metal channels covering and fixed to said flanges and bent-off portions.

In testimony whereof I affix my signature.

CLAUDIUS DORNIER.